June 19, 1973     S. P. MITOFF     3,740,268
METHOD OF CHARGING SODIUM-SULFUR CELL
Original Filed Jan. 4, 1971
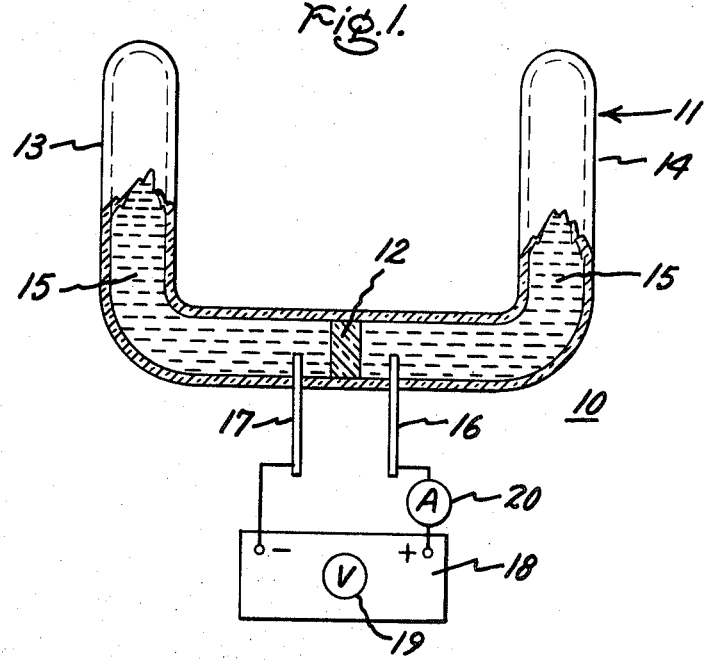
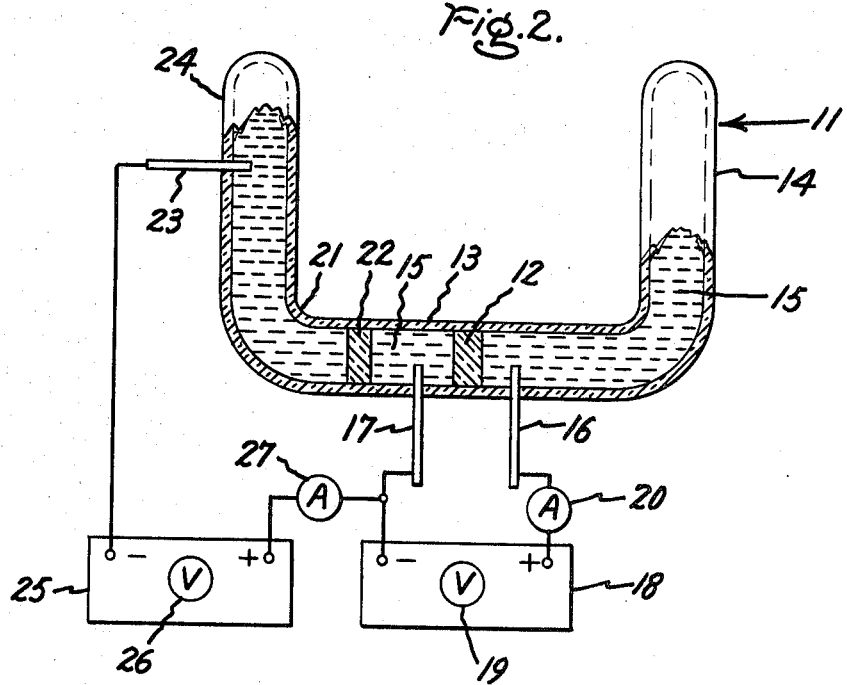

United States Patent Office 3,740,268
Patented June 19, 1973

3,740,268
METHOD OF CHARGING SODIUM-SULFUR CELL
Stephen P. Mitoff, Elnora, N.Y., assignor to
General Electric Company
Original application Jan. 4, 1971, Ser. No. 103,521.
Divided and this application Jan. 17, 1972, Ser.
No. 218,403
Int. Cl. H01m 45/04
U.S. Cl. 136—6 FS  3 Claims

ABSTRACT OF THE DISCLOSURE

A sodium-sulfur cell is described which includes an anodic reaction zone, a cathodic reaction zone, a solid crystalline ion conductive electrolyte therebetween, and a third electrode positioned in the cathodic reaction zone and insulated electrically from a portion of the cathodic reaction zone. One type of third electrode for this cell has a metal mesh adjacent the solid electrolyte. A thin porous insulator is positioned on opposite surface of the metal mesh adjacent the cathodic reaction material. A method of charging a sodium-sulfur cell employing such a third electrode is described also.

---

This is a division of application Ser. No. 103,521, filed Jan. 4, 1971, now Pat. No. 3,672,994.

This invention relates to sodium-sulfur cells and to methods of charging such cells and more particularly to such cells with a third electrode and methods of charging such cells employing such third electrodes.

Sodium-sulfur cells are known in the prior art as, for example, described in Kummer et al. Pat. 3,404,036, issued Oct. 1, 1968, under the title "Energy Conversion Device Comprising a Solid Crystalline Electrolyte and a Solid Reaction Zone Separator." The solid crystalline electrolyte in the above-mentioned sodium sulfur battery can be sodium beta-alumina.

While rechargeable sodium-sulfur batteries are desirable for the conversion of energy, a serious problem is the failure of such cells after limited number of cycles. The solid electrolyte of sodium beta-alumina cracks on the sulfur or cathodic surface, and such failure always occurs on the charge cycle. Thus, it would be desirable to provide a sodium-sulfur cell which could be cycled for a prolonged period of time without the attendant failure due to cracking.

My invention is directed to an improved sodium-sulfur cell with a third electrode and to methods of charging such a cell employing the third electrode.

The primary objects of my invention are to provide a rugged, long life, rechargeable sodium-sulfur cell and a method of charging such a cell.

In accordance with one aspect of my invention, a sodium-sulfur cell has an anodic reaction zone, a cathodic reaction zone, a solid crystalline ion conductive electrolyte therebetween, and a third electrode in the cathodic reaction zone and insulated electrically from a portion thereof.

These and various other objects, features and advantages of the invention will be better understood from the following description taken in connection with the accompanying drawing in which:

FIG. 1 is a side elevational view partially in section of a sodium-sulfur half cell with an additional electrode embodying my invention; and FIG. 2 is a side elevational view partially in section of a sodium-sulfur cell with a third electrode embodying my invention.

In FIG. 1 of the drawing, there is shown generally at 10 a sodium-sulfur half cell embodying my invention.

Sodium-sulfur half cell 10 is shown as comprising a cathodic reaction zone in the form of a U-shaped glass tube 11 with a sintered porous glass disc 12 in the approximate center of tube 11 thereby dividing the tube into portions 13 and 14. Each portion of the tube is partially filled with reactants 15 of sulfur and a sodium-sulfur compound such as molten sodium pentasulfide ($Na_2S_5$). An electrode 16 is in contact with reactants 15 in portion 14 of tube 11. An additional electrode 17 is in contact with reactants 15 in portions 13 of tube 11. Electrode 17 is insulated electrically from portion 14 of the cathodic reaction zone by disc 12. The ends of tube 11 are preferably sealed. A direct current power supply 18 with voltmeter 19 incorporated therein has its positive terminal connected to a positive electrode 16 through an ammeter 20. The negative terminal is connected to negative electrode 17. Such a half cell is provided with a suitable heater (not shown).

The half cell shown in FIG. 1 comprises the cathodic reaction zone of a sodium sulfur cell which is shown in FIG. 2 and described below. Such a half cell is charged or recharged by impressing an external source of direct current from a power supply such as 18 across the positive electrode 16 and negative electrode 17. I found that upon heating the cell to about 300° C. and upon imposition of a voltage across electrodes 16 and 17 that there was initially merely a nominal current flow. I found unexpectedly that when I applied a potential greater than 2.1 volts across the above electrodes that the current rose rapidly from its previous nominal value. I found further unexpectedly that upon removing the power source and measuring the open current voltage across the above electrodes that the voltage was 2.1 volts. This surprising discovery showed that the open circuit voltage across the above-mentioned electrodes in the half cell was identical to the open circuit voltage across a sodium-sulfur cell with a sodium beta-alumina electrolyte operating at a temperature of 300° C. This unexpected discovery showed further than sodium metal had been deposited on electrode 17 from the sulfur and sodium sulfur compound in portion 14 of tube 11.

In a sodium-sulfur battery it is during charging or recharging that the serious problem, the cracking of the sodium beta-alumina occurs. Such cracks after a limited number of cycles appear always to start on the sulfur side of the cell. I believe that the rason for such failure is the local depletion of sodium on the surface on the cathodic reaction zinc side of the cell. Such depletion can cause local high fields and uneven distribution of current. While I advance the above reason as a theory such theory seems feasible since cells which contain sodium on both sides of the solid electrolyte have been cycled for extensive periods of time without failure. It will be appreciated that the voltage across such a cell with sodium on both sides of the cell always remain small during charge and discharge.

I have found with my above sodium-sulfur half cell that I can provide a cathodic reaction zone with an additional electrode positioned in the zone but insulated from a portion of the zone and thereby during the charge cycle produce sodium on the additional electrode.

In FIG. 2 of the drawing there is shown a sodium-sulfur cell embodying my invention. Similar reference numerals from FIG. 1 are employed in FIG. 2 where appropriate. Portion 14 of tube 11 is filled with sulfur and a sodium-sulfur compound, and an electrode 16 is in contact with the reactant 15 in portion 14. If desired, prior to filling portion 14, a porous electronically conductive material, such as graphite felt, is used to fill portion 14. Reactants 15 are then added into portion 14. A glass disc 12 separates portion 13 from portion 14 and is filled with similar reactants 15. An additional electrode 17, which is a complete sodium-sulfur cell is referred to as a third electrode is in contact with reaction 15 and portion 14. The ends of tube 11 are sealed as in the configuration shown in FIG. 1. However, a further portion 21 is provided in tube 11 and filled with molten sodium. This portion 21 which is the anodic reaction zone is separated from the cathodic reaction zone consisting of portions 13 and 14 by means of a solid crystalline ion conductive electrolyte 22. Electrode 23 is in contact with the sodium 24 in portion 21 or the charge cycle direct current power source 18 with associated voltmeter 19 is connected from its positive terminal through ammeter 20 to positive electrode 16. The negative terminal is connected to third electrode 17 which is negative relative to positive electrode 16. A second direct current power source 25 with associated voltmeter 26 is connected through an ammeter 27 to the lead from the negative terminal of the first power source. The negative terminal of power source 25 is connected to negative electrode 23 whereupon electrode 23 is negative with respect to third electrode 17. Such a cell is provided with a suitable heater (not shown).

In the operation of the sodium-sulfur cell shown in FIG. 2 of the drawing at a temperature of about 300° C. during its discharge half cycle, sodium 24 is attracted to the sulfur compound within portions 13 and 14 of tube 11 on the opposite side of the sodium beta-alumina. Electrolyte 22 gives up an electron, passes through electrolyte 22 as a sodium ion and combined with the sulfur ion formed on the opposite side of electrolyte 22 with the exceptance of an electron. Thus an electrical current is caused to flow through the external circuit attached to electrodes 16 and 23. In the conventional charging of a sodium-sulfur battery an external source of electrical power would be impressed across electrodes 16 and 23 with a reverse electron flow in relation to that of the discharge half cycle. However, I have found in my novel method of charging the sodium-sulfur cell that I position a third electrode in the cathodic reaction zone and insulate electrically the third electrode from a portion of the cathodic reaction zone. I apply a potential greater than 2.1 volts, the open circuit voltage of a sodium-sulfur battery, across positive electrode 16 and negative electrode 17. Simultaneously I impress a small voltage such as 0.2 volt across third electrode 17 as the positive electrode and negative electrode 23. In this manner sodium is removed from reactants 15 and deposited upon the third electrode 17 thereby insuring a supply of sodium on the cathodic side of the solid electrolyte 22. The external voltage impressed across electrode 17 and electrode 23 transports the sodium in ion form through electrolyte 22 into portion 21 of tube 11. In accordance with my method I am able to produce sodium on the third electrode in the cathodic reaction zone near the cathodic surface of the solid electrolyte. In this manner the former local depletion of sodium on the surface with resulting local high fields and uneven current distribution are eliminated.

It will, of course, be appreciated that instead of the platinum wire shown in use as the third electrode a wide variety of current collectors can be employed. Additionally, various porous insulator materials can be used to insulate the third electrode from a portion of the cathodic reaction zone. It would also appear preferable to position the third electrode adjacent the cathodic side of the solid electrolyte.

Examples of sodium-sulfur half cells and sodium-sulfur cells which are made in accordance with my invention are set forth below.

EXAMPLE 1

A sodium-sulfur half cell was made as shown in FIG. 1 and described above in the application. A glass tube was fitted with a sintered porous glass disc at approximately its mid-point. The glass was then bent into a U-shaped configuration. The tube had then two adjacent portions separated by the glass disc. A platinum wire was inserted through the glass surface to be in contact with the interior of each portion of the tube and sealed thereto. Sulfur and sodium sulfide to form the approximate composition of $Na_2S_5$ were added to each of the tube portions after which the ends of the tube were sealed. A direct current supply with an assocaited voltmeter was connected to the respective platinum wires by a lead from its positive terminal through an ammeter to one electrode which would serve as the positive portion of the cell. The opposite negative terminal was connected by a lead to the other platinum wire to form a negative electrode for the cell. The tube was heated to a temperature of 300° C. by means of a resistant coil around the tube which coil is not shown in FIG. 1 of the drawing. Voltage was applied from the power source across the platinum wires and increased slowly. Nominal current flowed. When the voltage was increased above 2.1 volts a sudden linear increase in current occurred. After five minutes the power source was turned off and disconnected. A voltmeter was connected across the platinum wires to determine the open circuit voltage of the cell. The cell voltage remained above 2.1 volts for a few minutes, until the sodium at the third electrode no longer protected by the electric potential reacted with the sodium polysulfide.

EXAMPLE 2

A sodium-sulfur cell is made as shown above in FIG. 2 of the drawing and as described above in the application. The cell was initially formed as described above in Example 1 until after the sulfur and sodium pentasulfide were added to the other tube portion and shown on the left side of the drawing in FIG. 2. A sodium beta-alumina electrolyte was positioned adjacent the sulfur and sodium pentasulfide. A platinum electrode was inserted through the tube and sealed thereto to have contact with the interior of the tube. Molten sodium was then added to the open end of the tube and then both ends of the tube were sealed. In addition to the power supply used in connection with Example 1 a second power supply was provided which had an associated voltmeter and had a positive terminal connected through an ammeter to the negative terminal of the first power supply. The negative terminal of the second power supply was connected to the electrode in contact with the sodium. The tube was heated to a temperature of 300° C. by means of a resistant coil around the tube which coil is not shown in FIG. 2 of the drawing. A voltage of 2.3 volts is applied across the first pair of electrodes as described previously above in Example 1. A potential of 0.2 volt is applied across the lead in contact with the sodium which is the negative electrode and the second electrode of the first pair which is positive. In this manner the cell is charged by a sodium ion being transported to and deposited upon the other or third electrode positioned between the glass disc and the solid electrolyte. This sodium is transported by the second charging current as sodium ions through the solid electrolyte to form sodium in the sodium portion of the tube.

Thus it will be seen from the above examples that in accordance with my invention a sodium rich area as opposed to a sodium depleted area is available adjacent the cathodic side of the solid electrolyte. In this manner a current distribution is even and local high fields are eliminated.

While other modifications of the invention and variations thereof which may be employed within the scope of the invention have not been described, the invention is intended to include such as may be embraced within the following claims.

What I claim as new and desire to secure by Letter Patent of the United States is:

1. A method of charging a sodium-sulfur cell which comprises providing a cathodic reaction zone, providing a first electrode in electrical communication with said cathodic reaction zone, providing an anodic reaction zone, providing a second electrode in electrical communication with said anodic reaction zone, providing a solid crystalline ion conductive electrolyte therebetween, positioning a third electrode in the cathodic reaction zone, insulating electrically the third electrode from a portion of the cathodic reaction zone, applying a potential greater than 2.1 volts across the third electrode and the cathodic reaction zone in which the third electrode is negative with respect to the cathodic reaction zone, and simultaneously applying a potential of about 0.2 volt across the third electrode and the anodic reaction zone in which the third electrode is positive with respect to the anodic reaction zone whereby sodium is deposited adjacent the third electrode from the cathodic reaction zone and transported therefrom through the electrolyte to the anodic reaction zone.

2. A method of charging a sodium-sulfur cell as in claim 1, wherein the third electrode comprises a platinum wire which is insulated electrically from a portion of the cathodic reaction zone by a sintered porous glass separator.

3. A method of charging a sodium-sulfur cell as in claim 1, wherein the third electrode comprises a metal mesh which is insulated electrically from a portion of the cathodic reaction zone by a thin porous insulator.

References Cited
UNITED STATES PATENTS

| | | | |
|---|---|---|---|
| 3,238,437 | 3/1966 | Foster et al. | 136—83 R |
| 3,404,036 | 10/1968 | Kummer et al. | 136—6 FS |

ANTHONY SKAPARS, Primary Examiner

U.S. Cl. X.R.

136—83 R